US009443029B2

(12) United States Patent
Schultz et al.

(10) Patent No.: US 9,443,029 B2
(45) Date of Patent: Sep. 13, 2016

(54) METHOD AND SYSTEM FOR PROVIDING CONTEXT-BASED VIEW CONTENT MANAGEMENT

(75) Inventors: Paul T. Schultz, Colorado Springs, CO (US); Mark J. Hahn, Stow, MA (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 470 days.

(21) Appl. No.: 13/209,746

(22) Filed: Aug. 15, 2011

(65) Prior Publication Data
US 2013/0046831 A1 Feb. 21, 2013

(51) Int. Cl.
| | | |
|---|---|---|
| G06F 15/16 | (2006.01) | |
| G06F 17/30 | (2006.01) | |
| G06F 21/62 | (2013.01) | |
| H04L 29/06 | (2006.01) | |
| H04W 4/02 | (2009.01) | |

(52) U.S. Cl.
CPC ..... *G06F 17/30893* (2013.01); *G06F 21/6227* (2013.01); *G06F 21/6245* (2013.01); *H04L 63/102* (2013.01); *H04W 4/02* (2013.01)

(58) Field of Classification Search
CPC ........ G06F 21/6227; G06F 17/30893; G06F 21/6245; G06F 63/102; H04W 4/02
USPC .................. 709/206, 204, 205, 207
See application file for complete search history.

(56) References Cited

U.S. PATENT DOCUMENTS

| | | | | |
|---|---|---|---|---|
| 7,707,226 | B1 * | 4/2010 | Tonse ........................ | 707/796 |
| 7,865,373 | B2 * | 1/2011 | Punzak ................ | G06Q 10/10 |
| | | | | 705/2 |
| 2007/0223392 | A1 * | 9/2007 | Kim et al. ................... | 370/252 |
| 2008/0016232 | A1 * | 1/2008 | Yared et al. ................ | 709/229 |
| 2008/0125103 | A1 * | 5/2008 | Mock ........................... | 455/418 |
| 2008/0126729 | A1 * | 5/2008 | Cai ........................ | G06Q 10/10 |
| | | | | 711/164 |
| 2008/0177825 | A1 * | 7/2008 | Dubinko et al. ............. | 709/203 |
| 2008/0235623 | A1 * | 9/2008 | Li ................................. | 715/817 |
| 2009/0089682 | A1 * | 4/2009 | Baier et al. ................. | 715/751 |
| 2009/0234909 | A1 * | 9/2009 | Strandell et al. ............ | 709/203 |
| 2011/0276632 | A1 * | 11/2011 | Anderson et al. ........... | 709/205 |
| 2011/0295702 | A1 * | 12/2011 | Bhadury et al. .......... | 705/14.73 |
| 2012/0017266 | A1 * | 1/2012 | DiChiara et al. ............... | 726/4 |
| 2014/0095981 | A1 * | 4/2014 | Olawsky et al. ............ | 715/234 |
| 2015/0046192 | A1 * | 2/2015 | Raduchel ............ | G06F 19/323 |
| | | | | 705/3 |

* cited by examiner

*Primary Examiner* — Abdelnabi Musa

(57) ABSTRACT

An approach for providing context-based view content management is described. A request for content associated with a user is received. A view of a subset of the content is dynamically generated based on the request and context information associated with the user. Access to the view is provided for one or more user devices.

16 Claims, 10 Drawing Sheets

METHOD AND SYSTEM FOR PROVIDING CONTEXT-BASED VIEW CONTENT MANAGEMENT

BACKGROUND INFORMATION

Service providers are continually challenged to deliver value and convenience to consumers by providing compelling network services and advancing the underlying technologies. One area of interest has been the development of services and technologies relating to content and information management—e.g., information sharing. Given the rapid technological advancements in recent years, information sharing has become increasing easier and more widespread among all users. Consequently, the potential for fraud or inadvertent sharing of personal and confidential information has also seen a significant growth, leading to issues of identity theft, data theft, and loss of privacy. Although security enhancements on devices mitigate unilateral information taking, for instance, by hackers, it may not protect users from fraud or unintentional information sharing. For example, a user may knowingly enable access to the user's profile to share photos, but the user may not be aware that the user's address, phone number, email address, birthday, etc., are also made available.

Therefore, there is a need for an approach that can effectively provide context-based view content management.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing context-based view content management are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
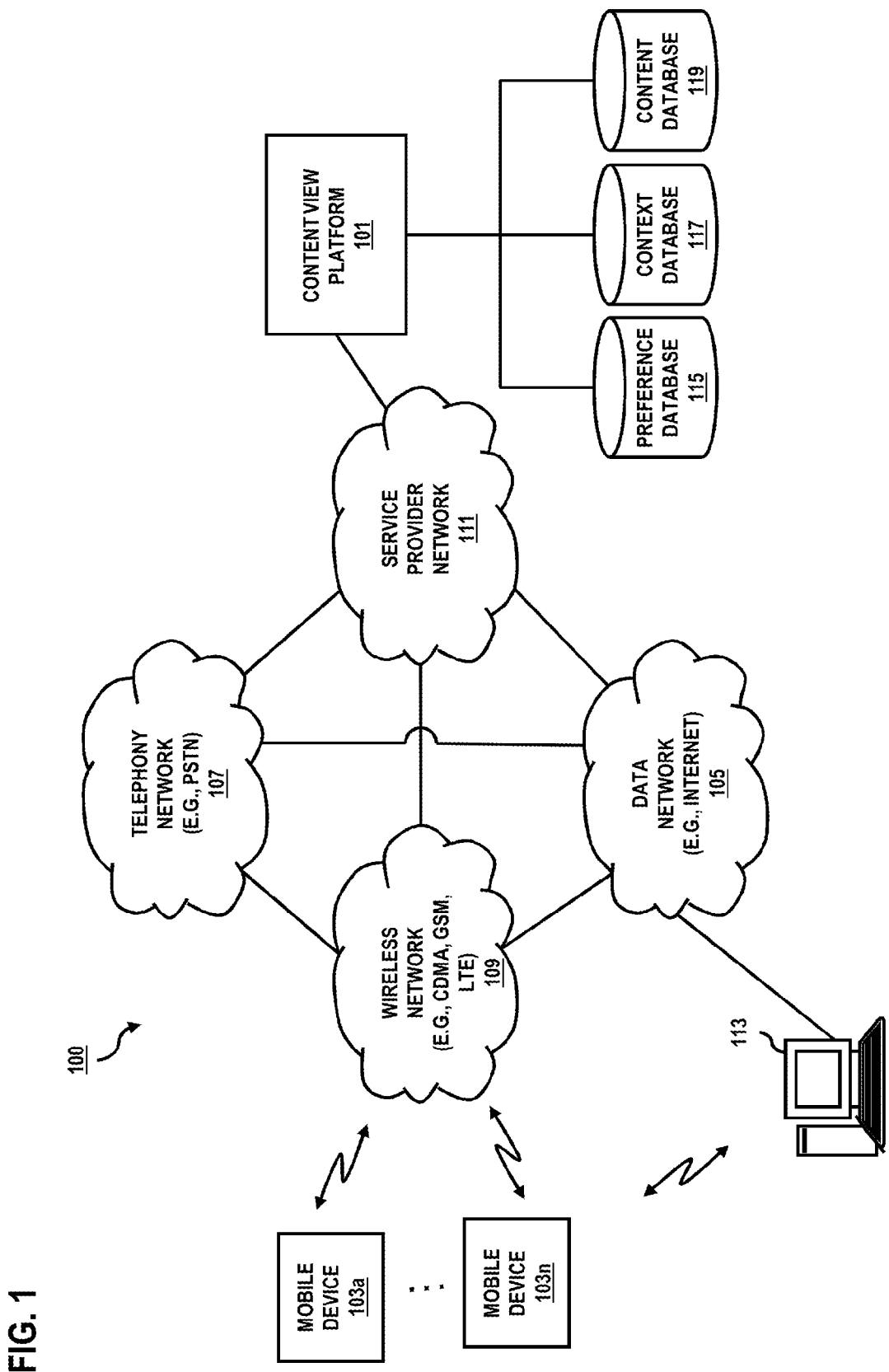
FIG. 1 is a diagram of a system capable of providing context-based view content management, according to an exemplary embodiment.

FIG. 1 is a diagram of a system capable of providing context-based view content management, according to an exemplary embodiment. For the purpose of illustration, the system 100 employs a content view platform 101 that is configured to provide context-based view content management to one or more user (or client) devices (e.g., mobile devices 103) over one or more networks (e.g., data network 105, telephony network 107, wireless network 109, etc.). According to one embodiment, context-based view content management may be managed services supplied by a service provider (e.g., a wireless communication company) as a hosted or subscription-based service made available to users of the mobile devices 103 through a service provider network 111. As used herein, a "view" portrays information stemming from a query of a database (or any other data store, such as an XML store, an object store, an semantic Resource Description Framework (RDF) store, NoSQL, etc.); thus, a view can include a stored or dynamically generated query result and may be accessible as a table (e.g., virtual table). As an example, a view may represent a subset of data that is sorted and displayed in a particular way. Thus, as shown, the content view platform 101 may be a part of or connected to the service provider network 111. According to another embodiment, the content view platform 101 may be included within or connected to a computing device 113, the mobile devices 103, etc. While specific reference will be made thereto, it is contemplated that the system 100 may embody many forms and include multiple and/or alternative components and facilities.

In certain embodiments, the content view platform 101 may include or have access to a preference database 115, a context database 117, or a content database 119. For example, the content view platform 101 may access the preference database 115, the context database 117, or the content database 119 to acquire user preference information, context information, or content, respectively. Moreover, the content view platform 101 may also add or modify the user preference information, the context information, or the content of the respective databases 115-119 as the content view platform 101 obtains new or updated information.

As mentioned, recent developments has led to increased ease and more widespread uses of information sharing. However, along with such developments has been the growth of the potential for problems such as identity theft, data theft, and privacy loss. Although users are often willing to provide information (e.g., in response to a request for content associated with the user), they are typically unaware of the scope of the information they are providing, the indefinite duration of access by others, and exactly who will have access to their information. As such, users generally share more information about themselves than necessary, including information that may be sensitive or confidential, which causes them to become vulnerable to the potential problems associated with information sharing.

To address this issue, the system 100 of FIG. 1 introduces the capability to restrict access to user content, for instance, to only the "need-to-know" information required to satisfy a specific request for user content (e.g., only when and where needed). By way of example, the content view platform 101 may restrict user information exposure through dynamically created views that are generated based on context information (e.g., location, calendar, presence, contact list, etc.) associated with a user. Upon receiving a request for content associated with the user, for instance, the content view platform 101 may dynamically generate a view of a subset of the content based on the request and context information associated with the user. The content view platform 101 may then provide access to the view for one or more user devices (e.g., requesting devices). Thus, the one or more user devices only have access to the subset of the content that the generated view offers. The one or more user device, for instance, may be heterogeneous devices, such as servers, desktops, notebooks, tablets, mobile devices, televisions, automobiles, appliances, medical devices, etc.

The initiator of a request (or the requestor) for content associated with a user may, for instance, be an application, a service provider system, another user device, etc. In a particular doctor's visit scenario, for instance, the doctor's office staff may, upon check-in, request the user's personal and insurance information required to proceed with treatment. In this instance, the content view platform 101 may dynamically generate a view including only information necessary to satisfy the request. For example, the office staff may initially only need the user's name, address, phone number, insurance company, insurance identification number, and co-pay information. As such, the generated view may be restricted only to such information. During this process, the content view platform 101 may have ascertained the user's current location, schedule calendar, etc., (e.g., to confirm that the user is indeed at the doctor's office) to determine the level and type of information that should be provided to the office staff. The content view platform 101 may have also checked the office staff's current location, appointment calendar, etc., to make such a determination (e.g., to confirm the identity of the requestor). The generated view may, in this case, be based on context information of the user and/or the initiator of the request (or the requestor). The content view platform 101 may then provide the office staff provide access to the view (e.g., via the office staff's mobile device 103, computing device 113, etc.), for instance, for the duration of the particular scheduled visit.

In another scenario, information that may be required for a job interview may include a job candidate's name, address, phone number, verification information (e.g., employment history, credit history, college transcripts, background check, etc.), salary history, resume, professional documents, social network information, references, etc. However, different personnel involved in the hiring process (e.g., the different requestors) may require different "views" of the job candidate's information. By way of example, a recruiter might only need preliminary or summary information required for initial vetting of potential job candidates. A hiring manager, on the other hand, might require more specific and personal information, such as salary history, references, etc. Moreover, a human resource representative might require a different subset of information from both the recruiter and the hiring manager in order to complete the hiring process.

In a further scenario, a user may also wish to have information security with regard to social networking. In this situation, the user may be provided with the ability to restrict views of personal/profile information to certain friends or classes of friends, relatives/family, coworkers, etc. For example, the user may not wish to provide address or location information to non-family social contacts. As later described, the views may be restricted based on user preference information in addition to the context information of the user.

It is noted that the mobile devices 103 may be any type of mobile terminal including a mobile handset, mobile station, mobile unit, multimedia computer, multimedia tablet, communicator, netbook, Personal Digital Assistants (PDAs), smartphone, etc. It is also contemplated that the mobile devices 103 may support any type of interface for supporting the presentment or exchange of data. In addition, mobile devices 103 may facilitate various input means for receiving and generating information, including touch screen capability, keyboard and keypad data entry, voice-based input mechanisms, accelerometer (e.g., shaking the mobile device 103), and the like. Any known and future implementations of mobile devices 103 are applicable. It is noted that, in certain embodiments, the mobile devices 103 may be configured to establish peer-to-peer communication sessions with each other using a variety of technologies—i.e., near field communication (NFC), Bluetooth, ZigBee, infrared, etc. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 111 as facilitated via a router.

In certain embodiments, the content view platform 101 may determine the context information based on historical data and dynamic data for the user and information on a pattern of use by the user (e.g., visited places, time and other circumstances associated with user activity, the frequency of such activities, etc.). In one use case, a user may need to have routine prescription refilled, for instance, on a periodic basis (e.g., weekly, bi-weekly, monthly, etc.). If the primary doctor is not available for any number of reasons, the user may ask a "substitute" doctor to authorize the user's routine prescription refills Thus, the "substitute" doctor may make a request for information relating to the user, such as personal information, insurance information, medical history, etc. Based on the prescription type and the refill frequency, the content view platform 101 may determine that certain prescriptions can and should be refilled. As such, the content view platform 101 may generate a view that is restricted only to information that is necessary for the "substitute" doctor to properly perform such authorization (e.g., omitting conditions, treatments, and psychological evaluations unrelated to the needed authorization).

In certain embodiments, the content view platform 101 may determine user preference information based on historical data for the user and information on a pattern of use by the user (e.g., visited places, time and other circumstances associated with user activity, the frequency of such activities, etc.), wherein the view is further based on the user preference information. In one scenario, a user may drop his/her children off at school every weekday morning and then drive directly to work from the school. On the way to the school, the user may want to play music that is appropriate for his/her children, but still geared towards the user's taste. On the way to work, however, the user may want the child-appropriate restriction removed. For example, in addition to the current location of the user and the current day/time, the content view platform 101 may also utilize user preference information based, for instance, the songs, samples, or playlists that the user has selected on prior occasions. As a further example, the user may also access a web-based self-service to set up, fine tune, and administer content access personal preferences, for instance, to restrict the user's vehicle audio system to child-appropriate music when the content view platform 101 determines that the user's children are in the vehicle. As a result, on the way to the school on weekday mornings, the view accessible by the user's vehicle is restricted to child-appropriate music that fits the user's taste (e.g., content database 119).

In certain embodiments, the content view platform 101 may generate a message to request an approval from the user to access the content. In one use case, a message requesting approval from the user may be dynamically generated when a request for content associated with the user is received. The message may thereafter be transmitted to the user in a number of ways, such as via short message service (SMS), instant message (IM), email, voice session, etc. If, for instance, the content view platform 101 determines that the user has approved the request, the view may then be further based on the approval. On the other hand, if the content view platform 101 determines that the user has denied the request, the view may be based on the denial. Alternatively, the content view platform 101 may determine not to generate the view in light of the denied request, or prevent access to the view and its associated content. A content denial by the user my also trigger further fraud prevention processing (e.g., reporting inappropriate personal information requests to the Better Business Bureau). In certain other embodiments, an approval (or denial) may be utilized to determine or modify context information or user preference information. By way of example, information relating to the approval may be stored, for instance, in the preference database 115, the context database 117, etc., for future use (e.g., as a preference to allow subsequent content access in the same context). Such information may include the context of the approval, the context information of the user or the requestor at the time of the approval, etc.

In certain embodiments, the content view platform 101 may determine to limit the access to the view per transaction or based on a predetermined time interval. For example, in the "substitute" doctor situation described previously, access to the view may be limited for the particular refill authorization (e.g., access expires when authorization to refill the prescription is granted or denied). Alternatively, access to the view may also be set to expire after predetermined duration calculated to be a reasonable time needed to grant or deny the authorization (e.g., 1 day, 1 week, etc.).

In some embodiments, the content view platform 101, the mobile devices 103, and other elements of the system 100 may be configured to communicate via the service provider network 111. According to certain embodiments, one or more networks, such as the data network 105, the telephony network 107, and/or the wireless network 109, may interact with the service provider network 111. The networks 105-109 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-109 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-109 may include components and facilities to provide for signaling and/or bearer communications between the various components or facilities of the system 100. In this manner, the networks 105-109 may embody or include portions of a signaling system 7 (SS7) network, Internet protocol multimedia subsystem (IMS), or other suitable infrastructure to support control and signaling functions.

Figure 2A:
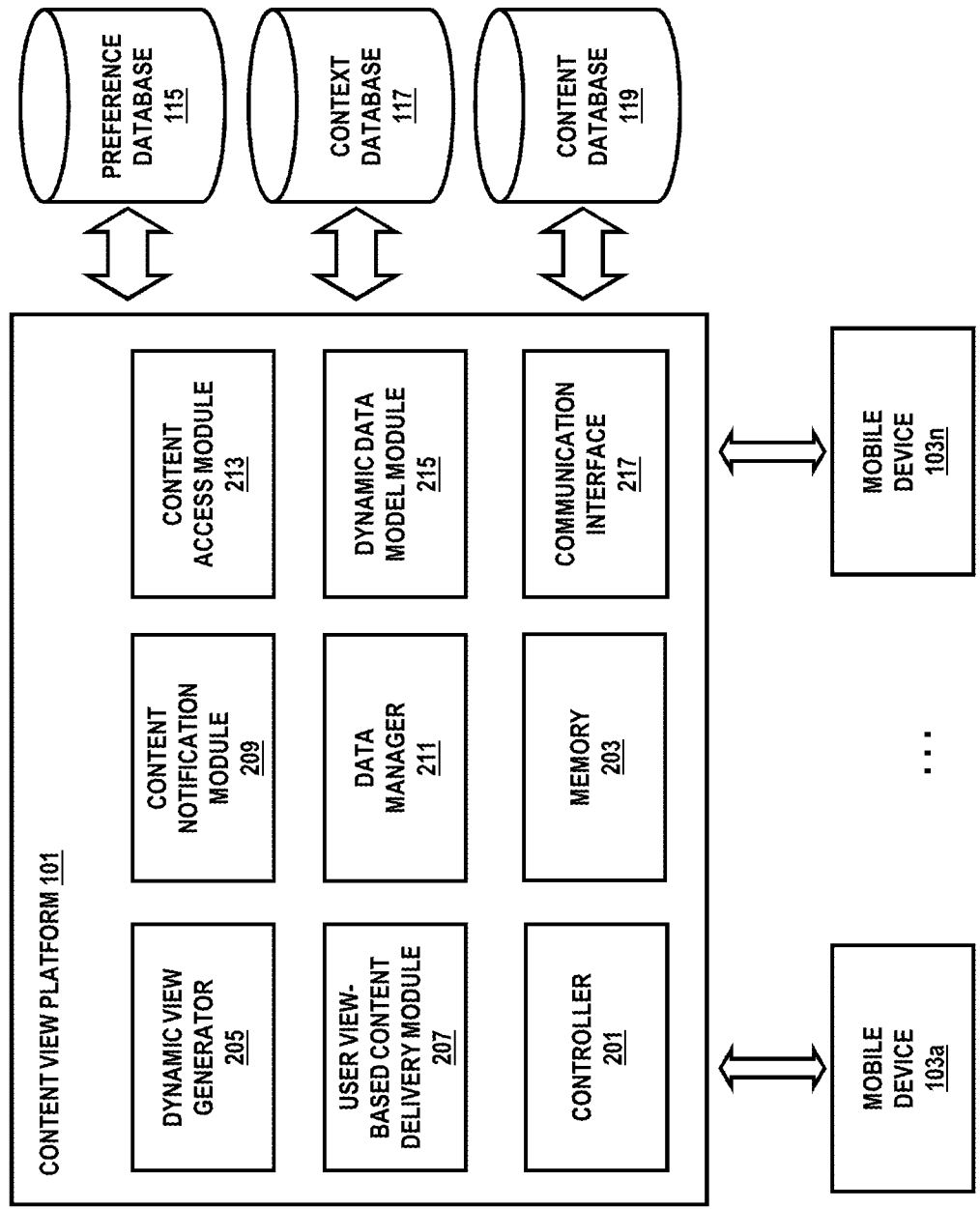
FIG. 2A is a diagram of the components of a content view platform, according to an exemplary embodiment.

FIG. 2A is a diagram of the components of a content view platform, according to an exemplary embodiment. The content view platform 101 may comprise computing hardware (such as described with respect to FIG. 8), as well as include one or more components configured to execute the processes described herein for providing context-based view content management services of the system 100. It is contemplated that the functions of these components may be combined in one or more components or performed by other components of equivalent functionality. In one implementation, the content view platform 101 includes a controller (or processor) 201, memory 203, a dynamic view generator 205, a user view-based content delivery module 207, a content notification module 209, a data manager 211, a content access module 213, a dynamic data model module 215, and a communication interface 217.

The controller 201 may execute at least one algorithm for executing functions of the content view platform 101. For example, the controller 201 may interact with the dynamic view generator 205 to receive a request for content associated with a user and to dynamically generate a view of a subset of the content based on the request and context information associated with the user. The dynamic view generator 205 may, for instance, access the context database 117 to obtain the context information associated with the user, and utilize the context information along with the request to create the view. Additionally, as mentioned, the dynamic view generator 205 may also utilize user preference information, for instance, from the preference database 115 to generate the view.

By way of example, as shown in Table 1 below, the content view platform 101 may provide for content delivery and communications treatment based on context-based view modification. The dynamic view generator 205 may, for instance, dynamically provide for a modified view based on the request (e.g., audio content, video content, work-related communications, school-related communications). Using an example from Table 1, the view associated with the request may, for instance, be a view for audio content. In one scenario, the requestor may be a vehicle (or an application associated with the vehicle) belonging to a particular user. Upon a triggering condition (e.g., detecting the user's presence, the vehicle being turned on, vehicle being placed in drive, etc.), the vehicle may initiate a request for music associated with the user. When the request is received, the dynamic view generator 205 may determine context information associated with the user, such as the current time, the day of the week, appointments or events on the user's calendar, or other context data (e.g., historical user data, pattern of use, other people in the vehicle based on their mobile device location, etc.). In this case, the dynamic view generator 205 has determined that the user is currently driving the vehicle in the morning. Based on the request and the determined context information, the modified view may be dynamically generated. Moreover, as indicated above, the modified view may also be dynamically generated based on preference information (e.g., explicitly ratings, historical user data, pattern of use, etc.) of the user. As further demonstrated by Table 1, the dynamic view generator 205 and the other components of the content view platform 101 may applied to many other circumstances, such as when the user is at home in the evening with family members, when the user is at the work desk, when the user is in a school classroom after work, etc.

TABLE 1

| View | Context | Modified View | Description |
|---|---|---|---|
| Audio Content | Driving AM | Play driving music in car | In car, play music based on the user, time of day/day of week, calendar and preferences. |
| Video Content | Home PM with Family Members | Play action movie at home | At home, play video based on the user (and others in close proximity to the user), time of day/day of week, calendar, and preferences. |
| Work Call Treatment | Work Desk | Conference call on calendar | When the user is present and available at her desk, automatically ring the user's work desk phone to join her to the conference call scheduled in her calendar. |
| Communications Treatment While at School | School Classroom After Work | DoNotDisturb (except for priority communications) | Routine messages and calls receive "user status is DoNotDisturb." |

Moreover, the dynamic view generator 205 may also operate in conjunction with the user view-based content delivery module 207 to accept content requests and to notify the user of a request for content via the content notification module 209 to obtain permission from the user for access to the content associated with the request. The content notification module 209 may, for instance, generate a message to request approval from the user to access the content, wherein the message is transmitted to the user via SMS, IM, email, voice session, etc. The dynamic view generator 205 may then generate the view based on whether the user grants permission to access the content.

Controller 201 may interact with the data manager 211 and the content access module 213 to obtain the content subset defined by the generated view. The data manager 211 may work with the content access module 213 to acquire information associated with the content subset, for instance, from the content database 119. The data manager 211 may also be used to limit the access to the view (thus, also the content subset associated with the view) per transaction or based on a predetermined time interval.

The controller 201 may also direct the dynamic data model module 215 to update the preference database 115 and the context database 117 based on context information and user preference information "learned." As described, historical data for the user and information on a pattern of use by the user may be used to determine the context information and the user preference information associated with the user.

The controller 201 may further utilize the communication interface 217 to communicate with other components of the content view platform 101, the mobile devices 103, and other components of the system 100. The communication interface 217 may include multiple means of communication. For example, the communication interface 217 may be able to communicate over SMS, internet protocol, instant messaging, voice sessions (e.g., via a phone network), or other types of communication. As provided, according to one embodiment, such methods may be used to transmit messages to acquire permission from the user to enable access to a content associated with a content request.

Figure 2B:
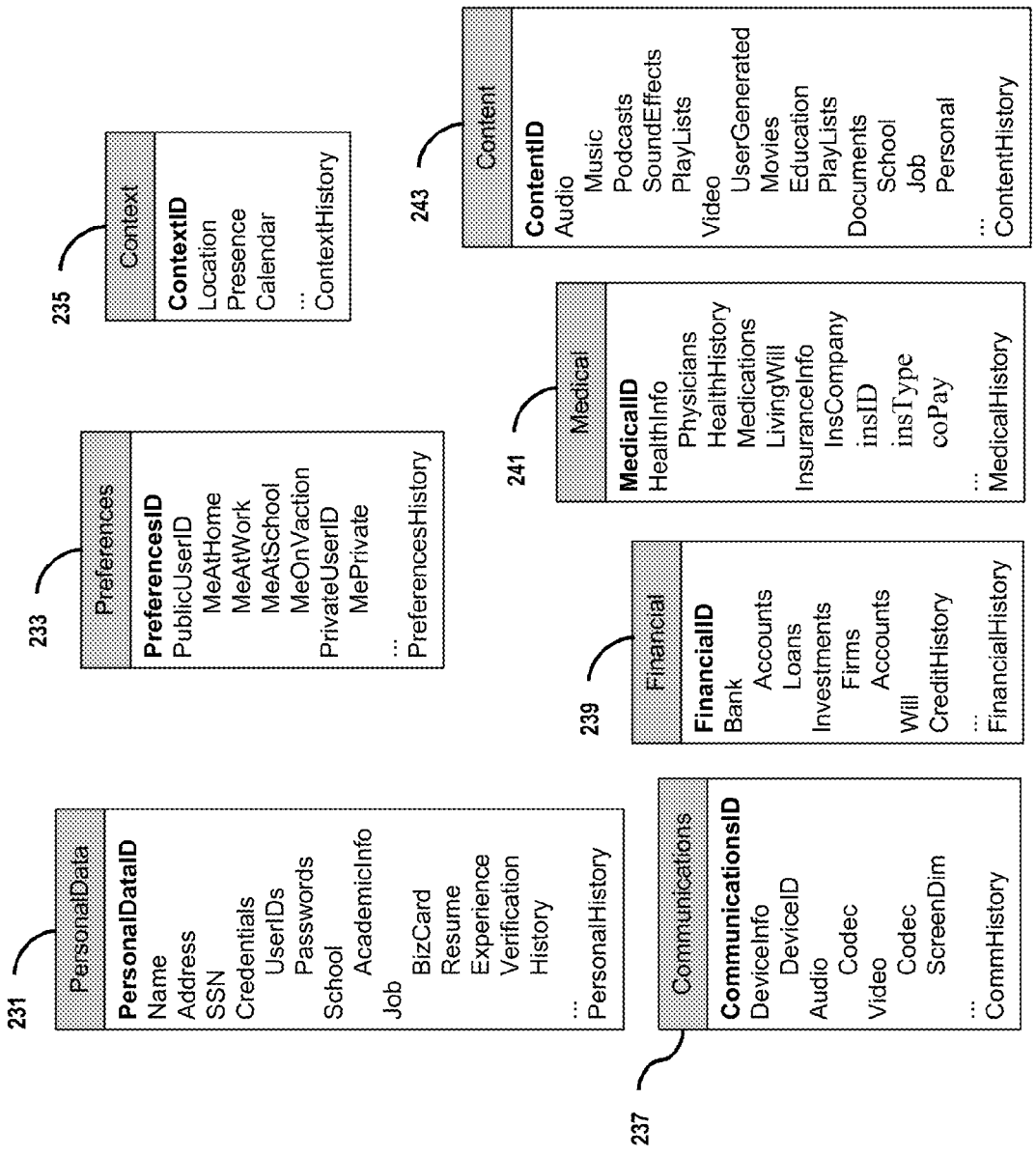
FIG. 2B is an illustration of entity-relationship diagrams for modeling information associated with a user, according to an exemplary embodiment.

FIG. 2B is an illustration of entity-relationship diagrams for modeling information associated with a user, according to an exemplary embodiment. As shown, the entity-relationship diagrams are represented using Unified Modeling Language (UML). It is noted, however, that any other notations or models may be utilized. Here, FIG. 2B features UML class diagrams 231-243 for the "PersonalData," "Preferences," "Context," "Communications," "Financial," "Medical," and "Content" classes. Referring to a previous example, a user may ask a "substitute" doctor to authorize one or more routine prescription refills (as opposed to asking the user's primary doctor). If, for instance, the "substitute" doctor is only being asked to authorize refills for a few prescriptions, the "substitute" doctor may actually only need a small portion of the user's medical history in addition to other information associated with the user (e.g., name, phone number, other confirmation information, etc.). By way of example, and with respect to the "Medical" class of FIG. 2B, the "substitute" doctor may only require some health history information, some medication information, and some insurance information from the class. Accordingly, the generated view may only contain such information. As explained, in this way, the "substitute" doctor and/or associated staff members may be prevented from accessing information that is both confidential and unnecessary for the particular transaction (e.g., the refill authorization). Moreover, to prevent unfettered access to the requested information, context information such as location, presence, calendar appointments, context history, etc., and preference information such as preferences associated with the distribution of private information, preference history, etc., may be used to further limit the scope of the access. As discussed, the access limitation may be related to the amount of accessible information, the access duration, users that may access the information, requestor of information, requestor's physical location, etc.

Figure 3:
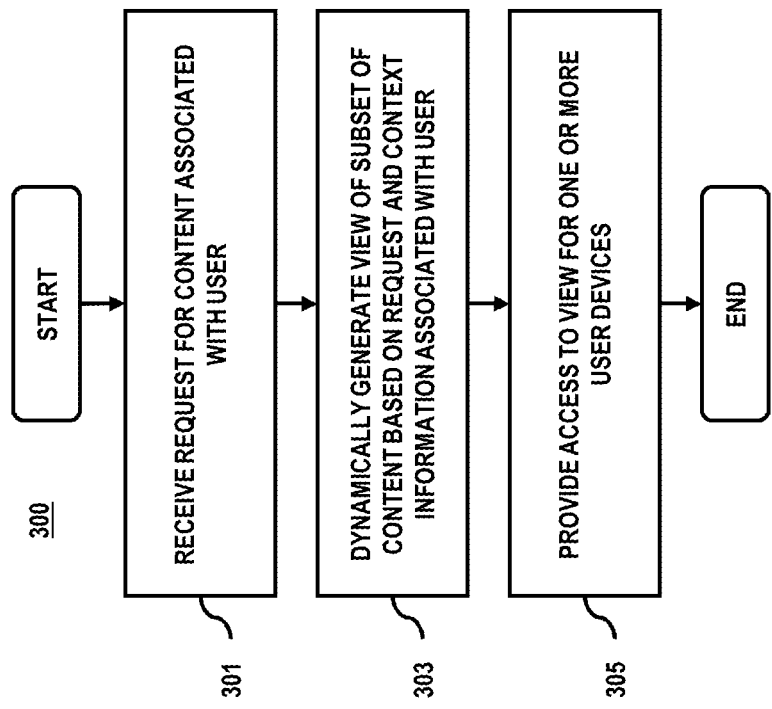
FIG. 3 is a flowchart of a process for providing context-based view content management, according to an exemplary embodiment.

FIG. 3 is a flowchart of a process for providing context-based view content management, according to an exemplary embodiment. For the purpose of illustration, process 300 is described with respect to FIG. 1. It is noted that the steps of the process 300 may be performed in any suitable order, as well as combined or separated in any suitable manner. In step 301, the content view platform 101 may receive a request for content associated with a user. As provided, an initiator of the request may, for instance, be an application, a service provider, another user, etc.

In step 303, the content view platform 101 may dynamically generate a view of a subset of the content based on the request and context information associated with the user. As mentioned, the context information may be based on historical data for the user and information on a pattern of use by the user (e.g., visited places, time and other circumstances associated with user activity, the frequency of such activities, etc.). Additionally, the view may also be based on user preference information, which may also be determined based on historical data for the user and information on a pattern of use by the user. As noted, the view may further be based on context information of the initiator of the request (e.g., the requestor, the requestor's location, etc.). For example, during a visit to the doctor's office, a user's location and schedule calendar may be used to determine that the user has an appointment at that particular doctor's office, and the doctor's office location and schedule calendar (or the location of the requesting device) may be used to confirm the identity of the requestor.

In step 305, the content view platform 101 may provide access to the view for one or more user devices. As discussed, the one or more user devices may be heterogeneous devices, such as servers, desktops, notebooks, mobile devices, televisions, automobiles, appliances, medical devices, etc. Although access to the view, and thus access to the content subset associated with the view, may be provided to broad range of devices, the information access is still restricted. For example, the view may be restricted only to information necessary to satisfy the request. In this way, by restricting access to sensitive information (e.g., contact information, identification, financial information, medical histories, purchase histories, etc.), users may be protected, for instance, from identify theft, data theft, and loss of privacy. The view may also be restricted to access by one or more approved requestors.

Figure 4:
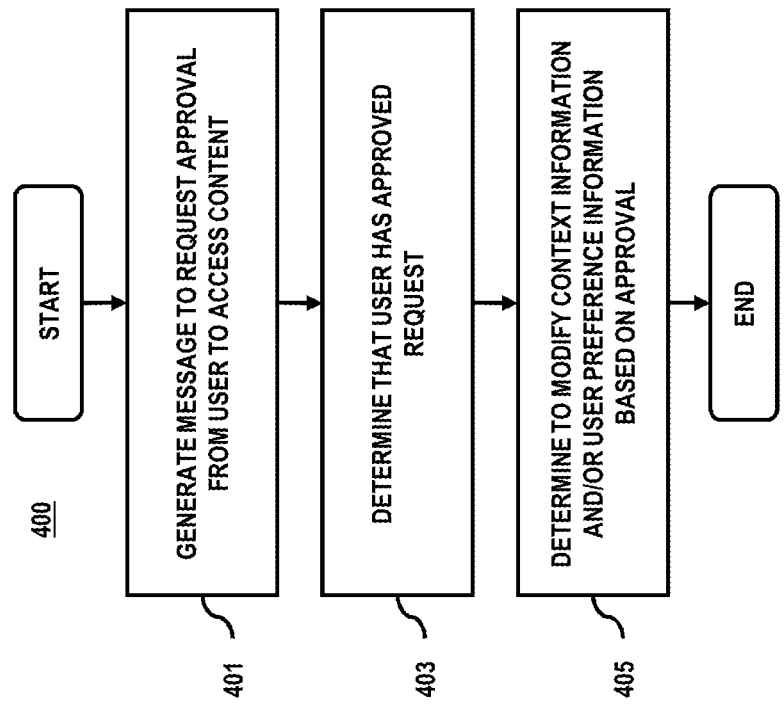
FIG. 4 is a flowchart of a process for obtaining user approval of a request for content, according to an exemplary embodiment.

FIG. 4 is a flowchart of a process for obtaining user approval of a request for content, according to an exemplary embodiment. For the purpose of illustration, process 400 is described with respect to FIG. 1. It is noted that the steps of the process 400 may be performed in any suitable order, as well as combined or separated in any suitable manner. In step 401, the content view platform 101 may generate a message to request an approval from the user to access the content. As discussed, the message may be transmitted to the user in a number of ways, such as via SMS, IM, email, voice session, etc. The content view platform 101 may, as in step 403, determine that the user has approved the request. As such, the view may be further based on the approval.

The content view platform 101 may also, as in step 405, modify the context information and/or user preference information of the user based on the approval. For example, the first time the user checks in at the doctor's office, the user may get a message (e.g., SMS) that asks the user to approve access to specific insurance information. Once the user approves this access, information relating to the approval may, for instance, be saved as a preference to enable subsequent content access in the same context (e.g., at that doctor office location, when the user's calendar indicates a doctor's appointment, etc.).

Figure 5:
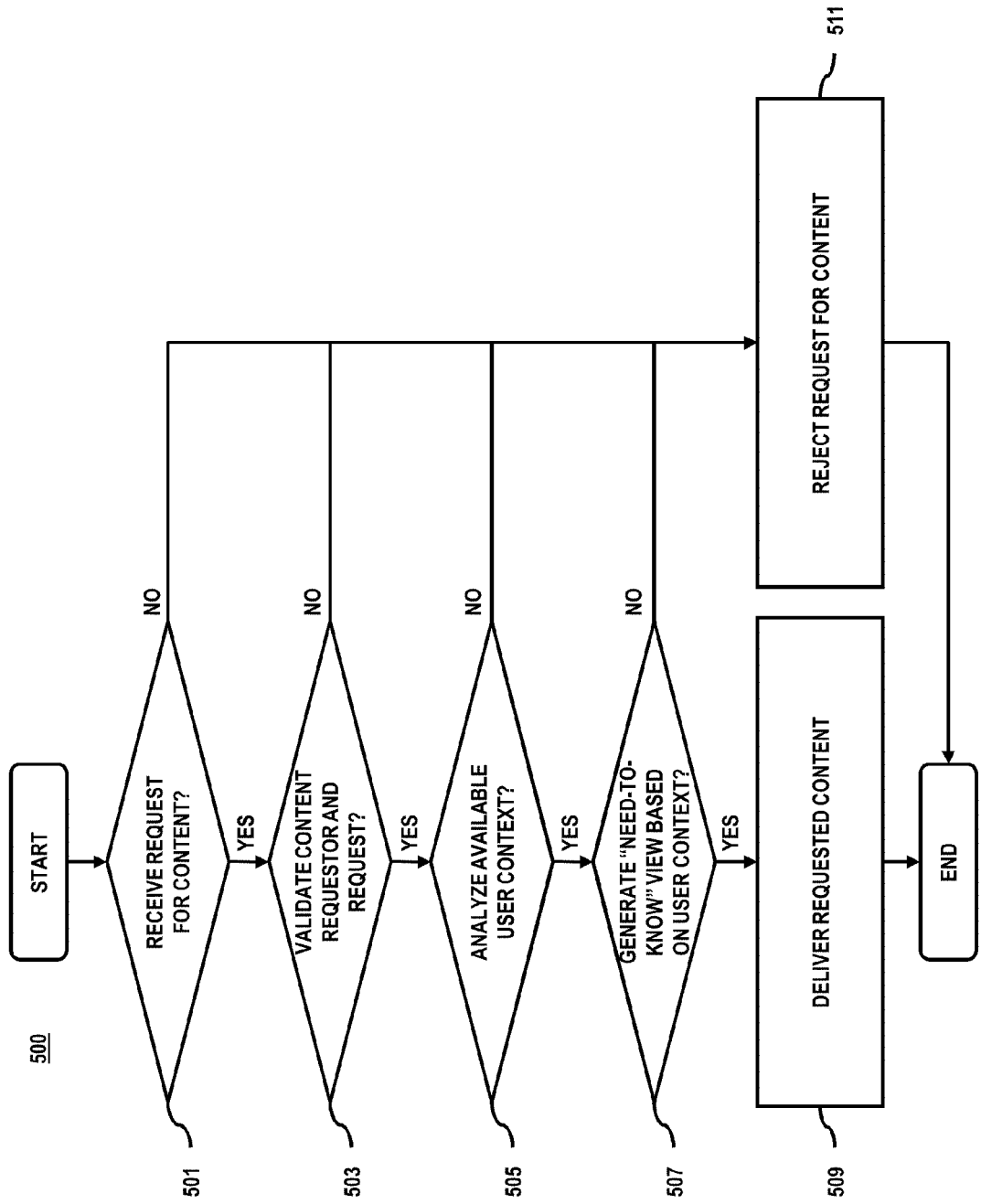
FIG. 5 is a flowchart of a process for obtaining user approval for content associated with a request, according to an exemplary embodiment.

FIG. 5 is a flowchart of a process for obtaining step-by-step user approval for content associated with a request, according to an exemplary embodiment. For the purpose of illustration, process 500 is described with respect to FIG. 1. It is noted that the steps of the process 500 may be performed in any suitable order, as well as combined or separated in any suitable manner. In step 501, the content view platform 101 may prompt a user to determine whether the user will allow requests from a particular requestor, wherein the requests are for content associated with the user. Alternatively, the user may also be prompted with an initial message to determine whether the user will even allow, for instance, third parties to request any content associated with the user. Thus, the user may be able to disable all requests for content. For example, users who suspect that they may be a victim of identity theft may choose to reject all requests for access to their information.

With respect to the particular requestor, however, if the user will accept content requests from the requestor, then the content view platform 101 may, as in step 503, ask the user whether the user will allow the validation of a content requestor (e.g., confirming identity) and a particular request; for instance, when a content request is purportedly from the particular requestor. Again, the user may have the option of rejecting the particular request notwithstanding the identity of the requestor. In this way, the user may choose to protect the user's sensitive information at any time even though the user had previously indicated that the user might be willing to share information.

If, however, the user allows the validation step (and assuming the request passes the validation step), the content view platform 101 may further, as in step 505, ask the user whether the user will allow available context information associated with the user to be analyzed. If the analyzing step is enabled, the content view platform 101 may, as in step 507, ask the user whether the user will allow the generation of a "need-to-know" view based on the context information of the user.

Upon approval of the steps 501-507, the content view platform 101 may, as in step 509, deliver the requested content, for instance, by allowing access to the generated view. On the other hand, if the user rejects any of the steps 501-507, the content view platform 101 may, as in step 511, reject the request for content altogether. It is noted, however, that different criteria may be used at each step. It is further noted that the rejection of one particular step in a similar step-by-step process may not, for instance, eliminate access to requested content altogether.

Figure 6:
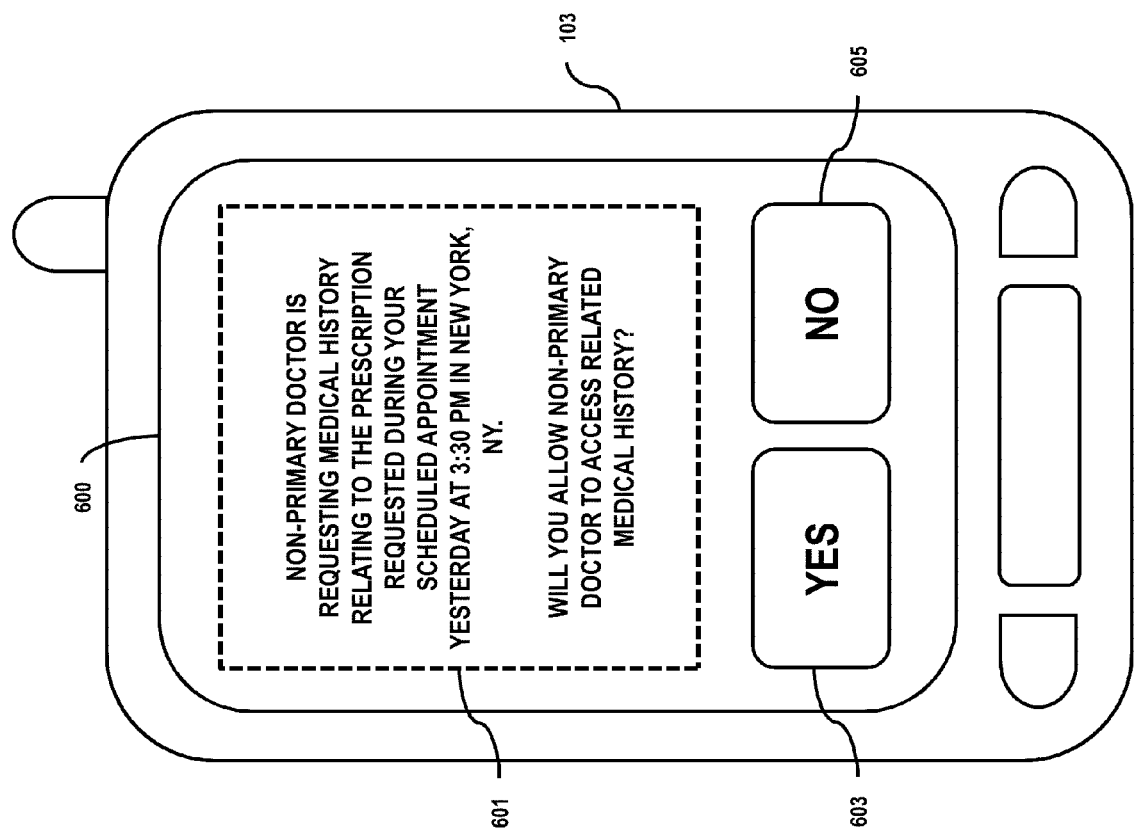
FIG. 6 is a diagram of a user interface for obtaining user approval of a request for content, according to various exemplary embodiments.

FIG. 6 is a diagram of a user interface for obtaining user approval of a request for content, according to various exemplary embodiments. For illustrative purposes, the diagram is described with reference to the system 100 of FIG. 1. For instance, FIG. 6 is a diagram of the mobile device 103 with the user interface 600 featuring message 601 and buttons 603 and 605. As mentioned, the content view platform 101 may dynamically generate a view of a subset of content associated with a user based on a received request for the content and context information associated with the user. The view may, for instance, be further based on approval from the user with respect to the received request. As such, the content view platform 101 may generate a message to request an approval from the user to access the content. According to one embodiment, the content view platform 101 may only generate the view on the condition that the user approved access to the content. Thus, the content view platform 101 may generate the view only if it is determined that the user has approved the request.

In this example, the message 601 includes information regarding the request (e.g., "Non-primary doctor is requesting medical history relating to the prescription requested during your scheduled appointment yesterday at 3:30 PM in New York, N.Y."). The message 601 then asks the user whether it will approve the non-primary doctor's request to access related medical history information. Here, the user has the option to select either button 603 (e.g., "Yes") or button 605 (e.g., "No"). In this case, if the user selects button 605, the request may be denied and the view associated with the request may not be generated. On the other hand, if the user selects button 603, it may be determined that the user has approved the request. As such, the view may be generated based on the approval among other criteria (e.g., context information, user preference information, etc.). It is noted, however, that different or additional dynamic approvals may be granted or denied by the user, e.g., responding "A" for Allow Once, "W" for Allow Always, or "D" for Deny Always.

Figure 7:
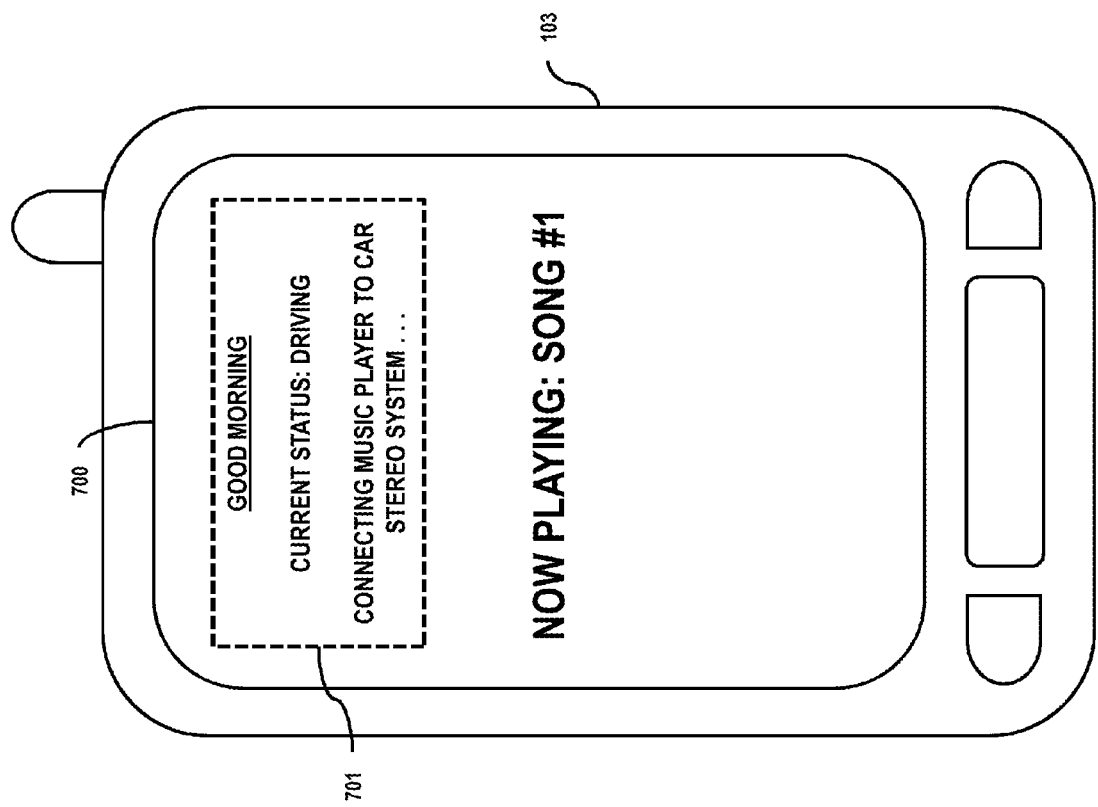
FIG. 7 is a diagram of a user interface for content consumption, according to an exemplary embodiment.

FIG. 7 is a diagram of a user interface for content consumption, according to an exemplary embodiment. For illustrative purposes, the diagram is described with reference to the system 100 of FIG. 1. For instance, FIG. 7 is a diagram of the mobile device 103 with the user interface 700 featuring message 701 and a "now playing" status. As discussed, the context information and the user preference information can be dynamically "learned," for instance, based on historical data for the user and information on a pattern of use by the user.

In this example, the message 701 greets the user (e.g., "Good Morning") and informs the user that the user interface 700 is currently in driving mode and, as a result, the music player associated with the user interface 700 is being connected to the car stereo system. In this case, the generated view includes context information and user preference information associated with the user, such as the current time, mode, location, preferred music, etc. As an example, the following code may have been dynamically generated to create the particular view associated with FIG. 7 (Table 2):

TABLE 2

CREATE VIEW MusicForUser1-DateTime-Location
AS SELECT preferences, title
  FROM Music
  WHERE context = morningDrivingToWork
SELECT music
  FROM audio
    WHERE title = 'Song' AND artist = 'Singer'

The above scenario is among many contemplated use cases for the described context-based user view content management mechanism.

The processes described herein for providing context-based view content management may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
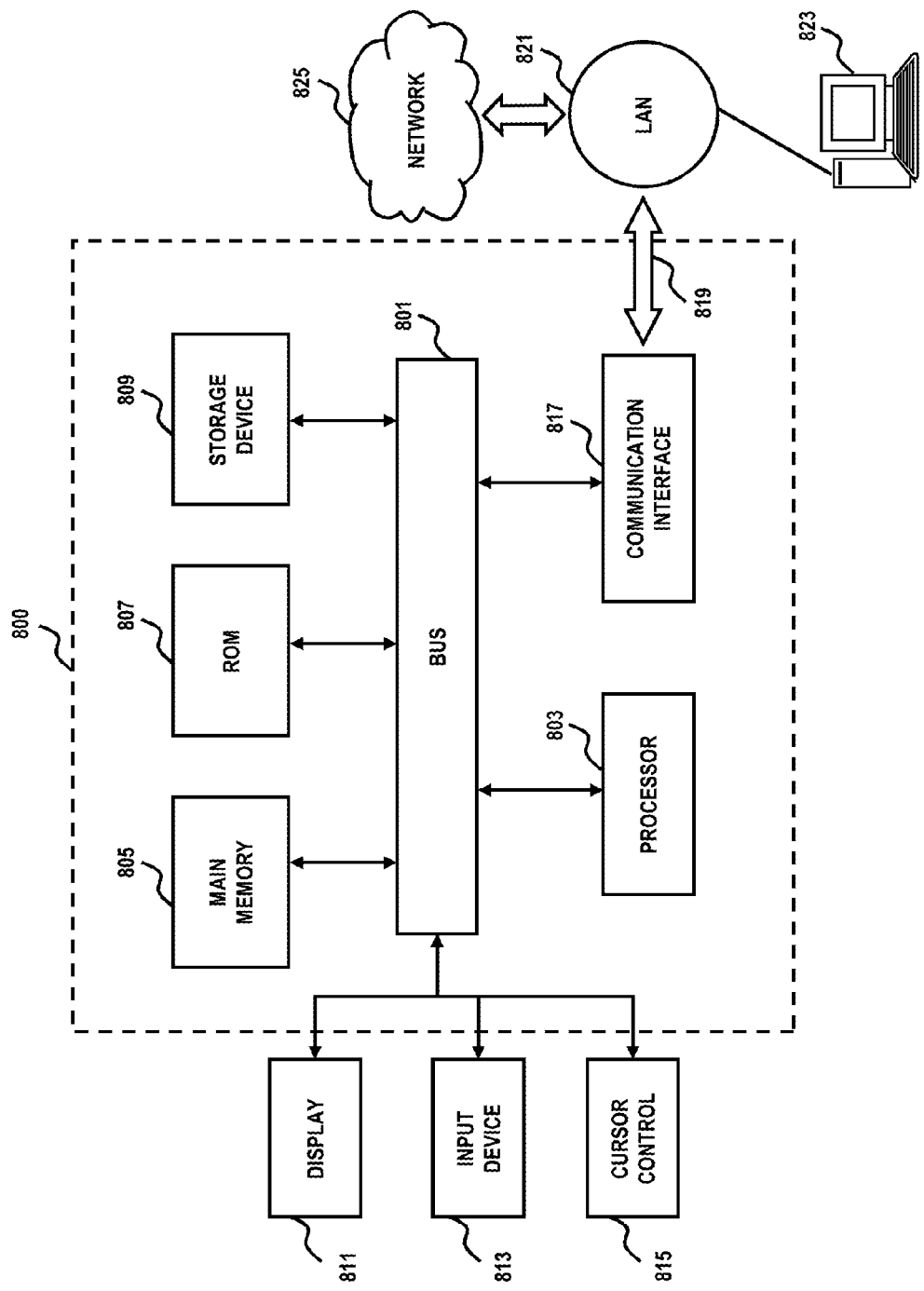
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touchscreen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
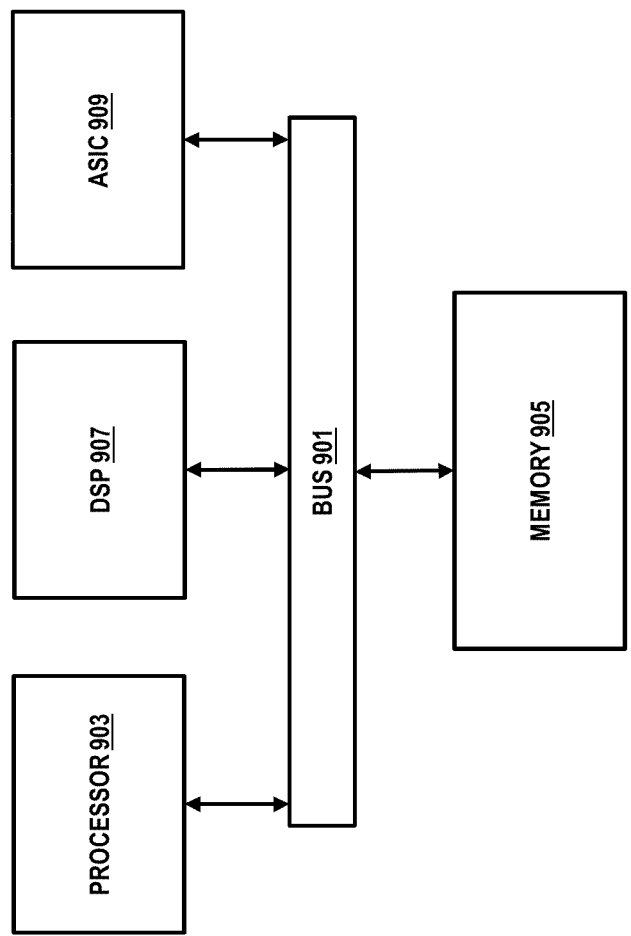
FIG. 9 is a diagram of a chip set that can be used to implement an embodiment of the invention.

FIG. 9 illustrates a chip set or chip 900 upon which an embodiment of the invention may be implemented. Chip set 900 is programmed to enable context-based view content management as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of context-based view content management.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable context-based view content management. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a request for content associated with a user, wherein an initiator of the request is a party other than the user and the request includes context information associated with the initiator of the request, and wherein the context information associated with the initiator of the request comprises location of the initiator of the request;
obtaining context information associated with the user;
confirming an identity of the initiator of the request based on the context information associated with the user and the context information associated with the initiator of the request;
generating, in response to receipt of the request and confirmation of the identity of the initiator of the request, a message to request an approval from the user to access the content by the initiator of the request;
upon determining that the user has approved the request, modifying the context information and user preference information, dynamically generating a view of a subset of the content based on the approval and the context information associated with the user, and providing access to the view for one or more user devices associated with the initiator of the request;
determining user preference information based on historical data for the user and information on a pattern of use by the user, wherein the view is further based on the user preference information;
storing information, including the context information, relating to approving the request as preference information to allow subsequent access to the content in a same context; and
limiting the access to the view by the initiator of the request for a predetermined time interval.

2. A method according to claim 1, further comprising:
determining the context information based on historical and dynamic data for the user and information on a pattern of use by the user.

3. A method according to claim 1, wherein the message is transmitted to the user via short message service (SMS), instant messaging (IM), email, voice session, or a combination thereof.

4. A method according to claim 1, further comprising:
in any case that the user denies the request, initiating fraud prevention processing.

5. A method according to claim 1, wherein the view includes only information necessary to satisfy the request.

6. A method according to claim 5, wherein the one or more user devices are heterogeneous devices.

7. A method according to claim 1, wherein the one or more user devices are heterogeneous devices.

8. A method according to claim 1, wherein the view is further based on context information of an initiator of the request.

9. An apparatus comprising:
at least one processor; and
at least one memory including computer program code for one or more programs,
the at least one memory and the computer program code configured to, with the at least one processor, cause the apparatus to perform at least the following,
receive a request for content associated with a user, wherein an initiator of the request is a party other than the user and the request includes context information associated with the initiator of the request, and wherein the context information associated with the initiator of the request comprises location of the initiator of the request;
obtain context information associated with the user;
confirm an identity of the initiator of the request based on the context information associated with the user and the context information associated with the initiator of the request;
generate, in response to receipt of the request and confirmation of the identity of the initiator of the request, a message to request an approval from the user to access the content by the initiator of the request;
upon determination that the user has approved the request, modifying the context information and user preference information, dynamically generate a view of a subset of the content based on the approval and the context information associated with the user, and provide access to the view for one or more user devices associated with the initiator of the request;
determine user preference information based on historical data for the user and information on a pattern of use by the user, wherein the view is further based on the user preference information;
store information, including the context information, relating to approving the request as preference information to allow subsequent access to the content in a same context; and
limit the access to the view by the initiator of the request for a predetermined time interval.

10. An apparatus according to claim 9, wherein the apparatus is further caused to:
determine the context information based on historical and dynamic data for the user and information on a pattern of use by the user.

11. An apparatus according to claim 9, wherein the message is transmitted to the user via short message service (SMS), instant messaging (IM), email, voice session, or a combination thereof.

12. An apparatus according to claim 9, wherein the apparatus is further caused to:
in any case that the user denies the request, initiating fraud prevention processing.

13. An apparatus according to claim 9, wherein the view includes only information necessary to satisfy the request.

14. An apparatus according to claim 13, wherein the one or more user devices are heterogeneous devices.

15. An apparatus according to claim 9, wherein the one or more user devices are heterogeneous devices.

16. An apparatus according to claim 9, wherein the view is further based on context information of an initiator of the request.

* * * * *